United States Patent [19]
de Germond

[11] 3,732,606
[45] May 15, 1973

[54] METHOD OF MAKING BEARINGS

[76] Inventor: Hubert de Germond, "Les Presles", Methon-Saint-Bernard, France

[22] Filed: July 2, 1971

[21] Appl. No.: 159,412

[52] U.S. Cl. ............................................29/148.4 A
[51] Int. Cl. ..............................................B23p 11/00
[58] Field of Search..................29/148.4 A; 308/193

[56] References Cited

UNITED STATES PATENTS 3,395,953   8/1968   Pitner..........................29/148.4 A

*Primary Examiner*—Thomas H. Eager
*Attorney*—Arthur E. Dowell, Jr., et al.

[57] ABSTRACT

A method for the manufacture of bearings, of the type in which rolling members are retained between two pairs of races. A cage constituted by two pairs of races and intermediate rolling members is placed within a mould which has two wedge like elements. As the mould is closed these two elements expand the cage radially outward. Plastics material is then injected into the mould on either side of the cage to encase same.

2 Claims, 5 Drawing Figures

PATENTED MAY 15 1973 3,732,606
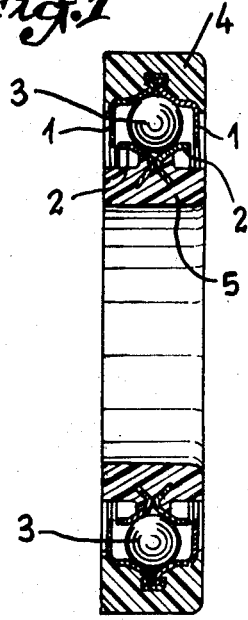
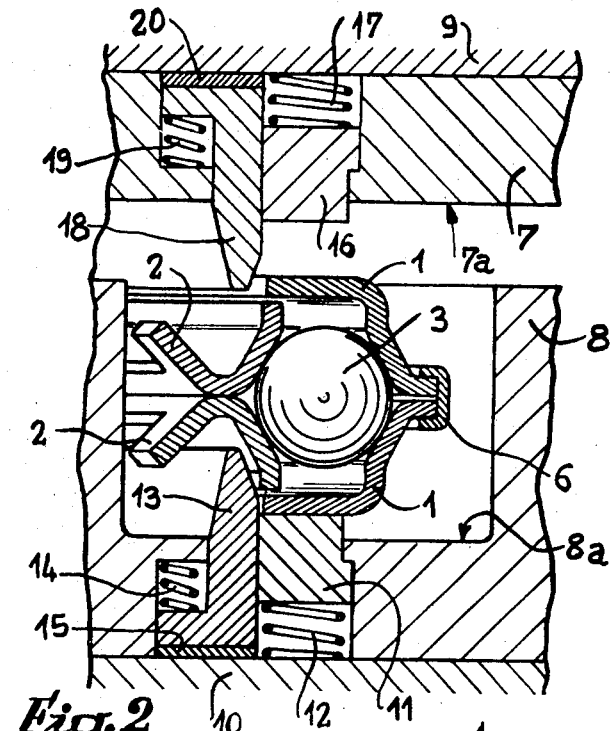
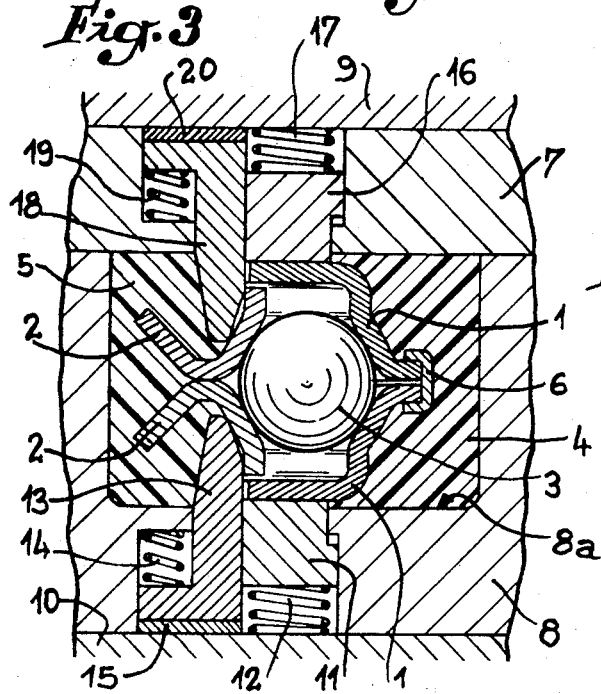
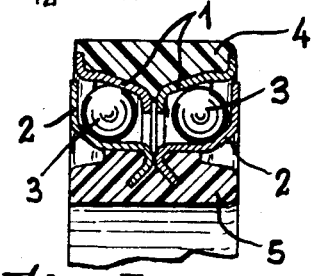
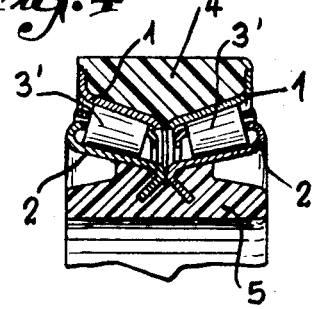
INVENTOR
Hubert de Germond
BY
ATTORNEYS

METHOD OF MAKING BEARINGS

The present invention relates to bearings and particularly to bearings of the type including rolling members, balls, rollers and the like.

It is known that bearings have already been proposed in which the rolling members (balls, rollers, or the like) are mounted between two annular masses of moulded plastics material inside each of which there are submerged two half rings constituted by independent metal races, which have an appropriate profile in section. During the moulding operation, the four races are centred on the rolling members in such a way that there are obtained in principle, at a very low cost price, bearings having operating characteristics which make it possible to satisfy a large number of uses.

The main problem which is encountered in the manufacture of bearings of the aforesaid type resides in the control of the shrinkage effect which appears in the two concentric masses of plastics material during the period of cooling which follows the shaping operation. It will be understood that this shrinkage tends to compress the outer races on the rolling members and the latter against the inner races, in such a way that the residual play necessary for the correct operation of the arrangement disappears and there are thus obtained bearings which "cease" and which tend to heat up. Now, tests have shown that whatever care is applied to the choice of the plastics material and to the regulation of the temperature throughout the shaping operation, it is practically impossible to produce bearings having a defined residual clearance.

It is an object of the present invention to obviate or mitigate this problem and to facilitate the manufacture of bearings of the aforesaid type in which the play provided between the rolling members and the two concentric pairs of metal races may be controlled as desired.

According to a first aspect of the present invention there is provided a method of manufacture of bearings in which rolling members are retained between two pairs of independent metal races submerged in two annular masses of moulded synthetic plastics material, said method including the steps of; placing inside a moulding cavity a cage constituted by two pairs of races and intermediate rolling members, closing the said cavity, expanding the said cage radially outwardly and injecting synthetic plastics material on either side of the said cage.

According to a second aspect of the present invention, there is provided a moulding device, for carrying out a method according to the first aspect of the present invention, having two elements which define the moulding cavity, each element comprising an annular abutment projecting inwardly of the moulding cavity and having a free edge adapted to act as a wedge, as the moulding cavity is closed, to urge the two inner races of the said cage radially outward.

According to a third aspect of the present invention there is provided a bearing of the type in which the rolling members are retained between two pairs of metal races submerged in two annular masses, or blocks, of moulded synthetic plastics material, said bearing being produced by a method according to the first aspect of the present invention. An embodiment of the present invention will now be described by way of example only with reference to the accompanying drawings in which:

FIG. 1 is a diametric section of a bearing produced according to the present invention.

FIG. 2 is a partial vertical section showing the arrangement of the moulding device for the manufacture of the bearing according to FIG. 1.

FIG. 3 is similar to FIG. 2 after the closing of the mould and the injection of the plastics material.

In manner known per se, the bearing illustrated in FIG. 1 comprises a metal cage constituted by two outer races 1 and two inner races 2 between which there is mounted a series of rolling members 3 formed by balls. The parts constituting this cage are assembled by means of two annular blocks 4 and 5 of plastics material.

As shown in more detail in FIG. 2, each race or half ring 1 has an outer wing directed transversely relative to the axis; this wing is connected by a central oblique section to a flange directed parallel to the said wing. The above mentioned flanges of the two races 1 are connected to each other by a film of synthetic material 6 which retains the assembly of the cage whilst allowing the parts of the latter to displace freely in relation to each other. Each inner race of half ring 2 has in section a profile in the shape of a V with a rounded base, the two races 2 being kept in contact with each other by means of this base.

The cage thus formed is introduced into a moulding device comprising two tractable elements 7 and 8, integral with plates 9 and 10, one of which is mobile; the moulding cavity which receives the cage 1, 2, 3 is defined by a recess 8a and the face 7a. This cage rests inside the recess 8a on the lateral wing of the race 1 which is turned downwards, this wing resting against an annular thrust member 11 connected to springs 12 which themselves abut against the lower plate 10. A ring 13 which projects inside the recess 8a and which itself is connected to springs 14 and to a keying ring 15 applied against the plate 10, is mounted against the face of this thrust member 11 which is turned towards the centre. The upper element 7 of the moulding device comprises in the same way an annular thrust member 16 urged by springs 17 and a ring 18 connected to springs 19 and to a keying ring 20.

Once the cage 1, 2, 3 is put in position inside the recess 8a the moulding device is closed and the plastics material is injected into the cavity 7a, 8a on either side of the said cage. It will be understood that the rings 13 and 18 at their free edge, come to bear against the inner races 2 and act as wedges to expand the cage radially outwardly, the outer races 1 being resiliently held in the correct position by the thrust member 16; this elastic retention allows a correct self-centering of the races 1 and 2 on the balls 3. When the part is extracted from the mould the inner races, no longer being under the action of the rings 13 and 18, resume their initial dimensions; this part (the two outer races 1 of metal and the annular block of plastic) is allowed to shrink freely. It will be seen that if the expansion of the inner part of the race produced by the wedge action of the rings 13 and 18 is greater than the eventual shrinkage of the outer race, then a clearance will be produced which is well defined and which may be altered by changing the thickness of the two keying rings 15 and 20 which are detachable for this purpose.

Tests have shown that the method according to the invention facilitates the manufacture of perfectly satisfactory bearings. The film 6 prevents any inoportune entry of plastics material inside the cage 1, 2, 3; naturally the balls 3 are able, if desired to be assembled by means of the usual cages.

The invention can be applied to the alternative embodiments of bearings in which the races or half rings, 1 and 2 are shaped so as to receive two rows of balls 3 as shown in FIG. 4 or conical rollers 3' as shown in FIG. 5.

What is claimed is:

1. A method of manufacture of bearings in which rolling members are retained between two pairs of independent metal races submerged in two annular masses of moulded synthetic plastics material said method including the steps of; placing inside a moulding cavity a cage constituted by two pairs of races and intermediate rolling members, closing the said cavity, expanding the said cage radially outwardly and injecting synthetic plastics material on either side of the said cage.

2. A method as claimed in claim 1, in which the radial expansion of the cage is obtained during the closure of the moulding cavity.

* * * * *